(12) United States Patent
Ueltschey, III et al.

(10) Patent No.: US 7,600,109 B2
(45) Date of Patent: Oct. 6, 2009

(54) METHOD AND SYSTEM FOR INITIALIZING APPLICATION PROCESSORS IN A MULTI-PROCESSOR SYSTEM PRIOR TO THE INITIALIZATION OF MAIN MEMORY

(75) Inventors: Charles Marion Ueltschey, III, Austin, TX (US); Charles Marslett, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 555 days.

(21) Appl. No.: 11/445,432

(22) Filed: Jun. 1, 2006

(65) Prior Publication Data

US 2007/0283137 A1    Dec. 6, 2007

(51) Int. Cl.
*G06F 15/177* (2006.01)
(52) U.S. Cl. .......................................... 713/2; 710/10
(58) Field of Classification Search ................ 713/1, 713/2; 710/10
See application file for complete search history.

(56) References Cited

U.S. PATENT DOCUMENTS

| | | | |
|---|---|---|---|
| 5,729,675 A | 3/1998 | Miller et al. | 395/183.12 |
| 5,768,585 A | 6/1998 | Tetrick et al. | 395/652 |
| 5,938,765 A | 8/1999 | Dove et al. | 713/1 |
| 6,108,781 A | 8/2000 | Jayakumar | 713/2 |
| 6,158,000 A | 12/2000 | Collins | 713/1 |
| 6,336,185 B1 * | 1/2002 | Sargenti et al. | 713/2 |
| 6,925,556 B2 | 8/2005 | Hill et al. | 713/2 |
| 7,065,688 B1 * | 6/2006 | Moyes et al. | 714/718 |
| 7,424,604 B2 * | 9/2008 | Schelling | 713/2 |
| 2003/0093510 A1 | 5/2003 | Cen | 709/223 |

FOREIGN PATENT DOCUMENTS

EP    1444573 A2    8/2004

* cited by examiner

*Primary Examiner*—Thuan N Du
(74) *Attorney, Agent, or Firm*—O'Keefe, Egan, Peterman & Enders, LLP (57) ABSTRACT

Methods and systems are disclosed for multi-processor initialization in an information handling system with two or more application processors (APs). One of the APs is configured to be a boot strap processor (BSP) that communicates with the other APs to initialize them prior to initialization of main memory. A basic input output system (BIOS) can be coupled to the APs and can be configured to hold BSP code and AP code used for initialization. APs are then discovered and initialized before the main memory of the system is initialized.

20 Claims, 8 Drawing Sheets

METHOD AND SYSTEM FOR INITIALIZING APPLICATION PROCESSORS IN A MULTI-PROCESSOR SYSTEM PRIOR TO THE INITIALIZATION OF MAIN MEMORY

TECHNICAL FIELD OF THE INVENTION

This invention relates to multi-processor initialization in information handling systems and, more particularly, to initialization of multi-core, multiple-thread microprocessors in personal computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems operate by running considerable initialization code at start-up. This initialization code is often stored in non-volatile memory within the system as part of the basic input output system (BIOS) of the system, and this initialization code will run when the system is powered up. In part, this initialization code typically includes code to initialize main memory for the system and to initialize the processors within the system. In multi-processor configuration, the system is typically configured in hardware to treat one of the CPUs (central processing units) as the boot strap processor (BSP) for the system. The BSP is the processor that has primary control over the initialization process. As such, the BIOS will begin operation by initializing the BSP at which time the BSP begins running the BIOS software code for the BSP to perform discovery and initialization of processors within the system.

More and more, information handling systems are taking advantage of advances in microprocessor technology to provide multi-processor systems in the form of microprocessors with multiple processing cores and/or microprocessors with multiple processing threads. Each processing core or each thread within each core is typically referred to as a distinct application processor (AP). In particular, current processors can have multiple cores (CPUs), and each core can have multiple threads (logical CPU). During the typical boot process, the BIOS must discover, map, and initialize all the application processors (APs) in a system. In these multi-processor environments, therefore, the BIOS must handle the initialization of each CPU, as well as the processing cores and threads within these CPUs. Traditionally, main memory for the system is initialized prior to multi-processor initialization. Because memory is shared among the CPUs, there is a need for the memory to be first initialized so that set mechanisms or locked semaphores exist to protect memory from being corrupted by shared CPU accesses.

During system initialization, some of the initialization tasks for the system may require a reset of the system. A reset late in power-on system test (POST) startup of the system can cause much of the initialization code in the BIOS to be re-run, resulting in increased boot time, as well as more complicated and less robust paths through POST. Current multi-processor initialization practices require the BSP to initialize the memory and use semaphores to coordinate memory accesses by the processors in the system. The requirement for atomic (locking) memory hardware upon which to build the semaphores forces processor initialization to occur late in POST, after the memory system has been initialized.

One initialization event that occurs late in initialization and can require reset is a modification to a processor power state. Some current microprocessors, for example, microprocessors available from Intel Corporation, have the capability of being operated in a number of different power states. In addition, current systems also now support different CPUs that routinely use the same form factor for attachment to a motherboard. These different CPUs, however, can have different power, current and frequency operating parameters, and these parameters can change depending upon the power mode within which the CPU is operating. The chipset or hardware for the system must, therefore, determine whether it can handle the required CPU operating parameters at the CPU's higher power modes. Depending upon the CPU and the power modes for that CPU, the hardware may or may not be able to allow the CPU to move to its higher power modes. The CPU will typically begin in a low power mode, with a handshake process occurring to determine if the CPU can move up power states. When the CPU moves up, however, the CPU is often required to go through a CPU reset cycle.

One problem with such a CPU reset is that it typically requires a system reset, and this in turn requires the initialization code in the BIOS to be re-run. Because the CPU power changes are also done during multi-processor initialization and after main memory initialization, much of the BIOS initialization code has to be repeatedly re-run. Thus, when a processor is moved to a higher power mode and requires a reset, memory initialization must be skipped or redone. If redone, the boot time can be significantly impacted and lengthened. If skipped, another problem can occur with certain processor sleep modes, where the CPU is put asleep but main memory is preserved. If memory initialization is skipped when CPUs are reset, the main memory may be less stable and, therefore, wakeup from the sleep/memory-preserved modes can be compromised.

SUMMARY OF THE INVENTION

Multi-processor initialization is disclosed for an information handling system having multiple processing cores and/or multiple processing threads such that multiple application processors are initialized prior to initialization of main memory. This multi-processor initialization can take advantage of shared memory within the system and can use BIOS (basic input output system) code state machines to allow communication between the BSP (boot strap processor) and other CPUs (central processing units) or logical CPUs so that each application processor (AP) within the system can be identified and initialized.

In one example embodiment, a method for multi-processor initialization in an information handling system is disclosed, including providing two or more application processors (APs) within an information handling system, configuring one of the APs to be a boot strap processor (BSP) for the information handling system, operating the BSP to communicate with the other APs to initialize the APs prior to initialization of main memory, and operating each AP to communicate with the BSP for AP initialization. In addition, the method can include providing a basic input output system (BIOS) within the information handling system and configuring the BIOS to have BSP code and AP code utilized by the BSP and the APs to perform the operating steps. Still further, the method can include utilizing shared memory to communicate between the BSP and the APs for the operating steps, and this shared memory can be separate or different from the main memory of the system. As described below, other features and variations can be implemented, if desired, and related systems can be utilized, as well.

In another example embodiment, an information handling system having multi-processor initialization for multiple application processors is disclosed, including two or more application processors (APs) within an information handling system with at least one application processor (AP) configured to be a boot strap processor (BSP) for the information handling system, a basic input output system (BIOS) coupled to the APs, main memory coupled to the APs, BSP code within the BIOS, the BSP code configured to cause the BSP to communicate with the other APs in order to initialize the APs prior to initialization of main memory, and AP code within the BIOS with the AP code configured to cause each AP to communicate with the BSP for AP initialization. The system can further include shared memory coupled to the BSP and to each other AP, and the BSP code and AP code can be configured to cause the BSP and APs to utilize the shared memory to communicate for multi-processor initialization. In addition, the shared memory can be separate or different from the main memory. For example, the shared memory can be a plurality of registers accessible to the BSP and the APs. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As describe herein, systems and methods are provided for multi-processor initialization in an information handling system having two or more application processors (AP). Each processing core within a microprocessor and/or each thread in a multi-thread processor or processor core is identified as a separate AP. Typically, one of the APs is a configured within the system as the boot strap processor (BSP) for the information handling system. This BSP has primary control over the initialization process. To more efficiently initialize multiple processors within the system as described herein, the BSP communicates with the other APs to initialize the APs prior to initialization of main memory. A basic input output system (BIOS) within the information handling system is configured to have BSP code and AP code utilized by the BSP and the APs to perform the initialization steps. Shared memory coupled to the BSP and each other AP can be used for communication between the BSP and the APs for the initialization steps according to a defined procedure that helps reduce the need for a complicated locking semaphore protocols in order to protect shared memory.

Figure 1:
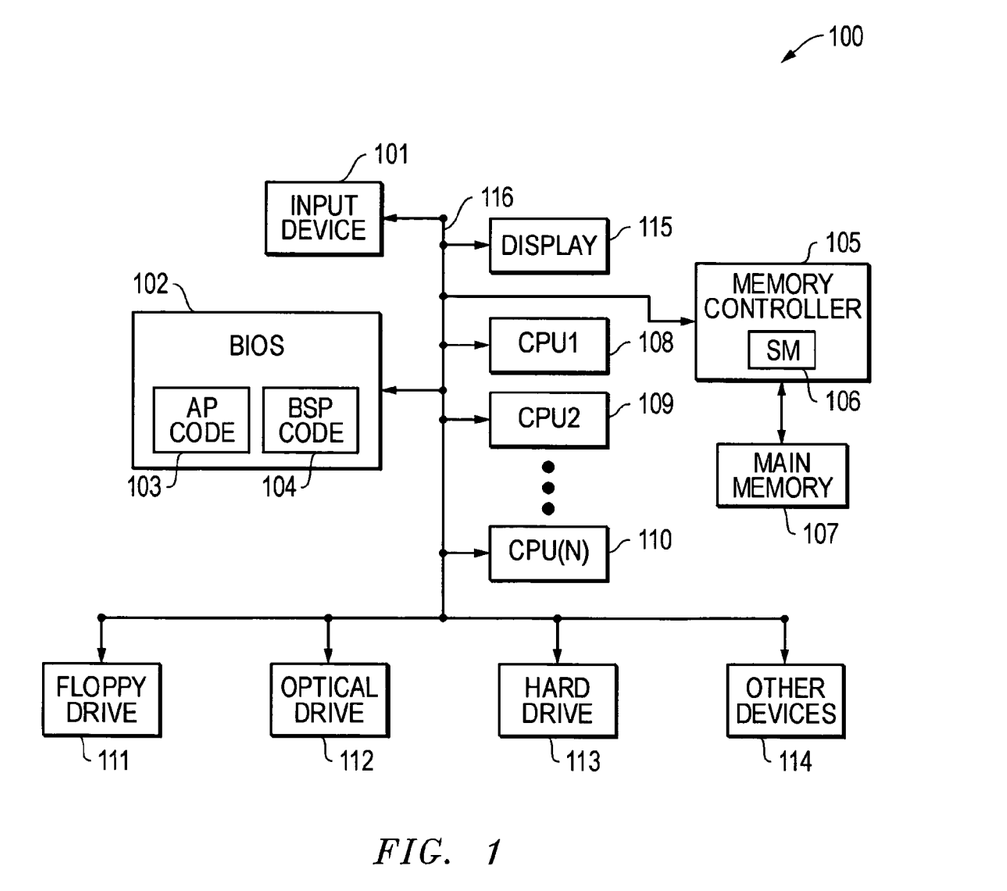
FIG. 1 is a block diagram of an information handling system including a plurality of central processing units (CPUs), a basic input output system (BIOS) with boot strap processor (BSP) code and application processor (AP) code, a memory controller and main memory.

FIG. 1 is a block diagram of an information handling system 100 including a plurality of central processing units (CPUs) 108, 109 . . . 110, a basic input output system (BIOS) 102 with boot strap processor (BSP) code 104 and application processor (AP) code 103, a memory controller 105, and main memory 107. The CPUs 108, 109 . . . 110 (CPU1, CPU2 . . . CPU(N)) each may be a microprocessor in the form of an integrated circuit, for example, as is available from Intel Corporation. The CPUs 108, 109 . . . 110 (CPU1, CPU2 . . . CPU(N)) can be coupled to various other components by system bus 116. For example, these components can include an input device 101 (e.g., keyboard, mouse, etc.), a display 115, a floppy drive 111, an optical drive 112, a hard drive 113 and/or other devices 114. In addition, the 108, 109 . . . 110 (CPU1, CPU2 . . . CPU(N)) can be coupled to communicate with main memory 107 through the memory controller 105. The memory controller 105 can also include shared memory (SM) 106.

As discussed in more detail below, the multiple CPUs 108, 109 . . . 110 (CPU1, CPU2 . . . CPU(N)) provide multiple APs, and one of these APs is configured as the BSP. The BSP code 104 within the BIOS 102 is configured to cause the BSP to communicate with the other APs in order to initialize the APs prior to initialization of main memory 107. The AP code 103 within the BIOS 102 is configured to cause each AP to communicate with the BSP for AP initialization. In the example embodiments below, the BSP code 104 and the AP code 103 are configured to use the shared memory (SM) 106 to provide for communications between the BSP and the APs for multi-processor initialization without requiring the use of main memory 107.

Figure 2A:
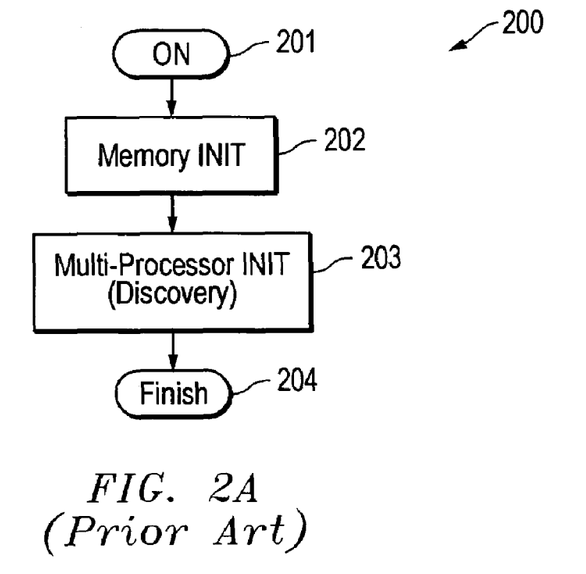
FIG. 2A (prior art) is a block diagram of a prior initialization process for an information handling system with memory being initialized prior to application processor discovery and initialization.

FIG. 2A (prior art) is a block diagram of a prior initialization process 200 for an information handling system 100 with memory being initialized prior to multi-processor discovery and initialization. As shown, for prior solutions, the initialization begins when a computer is powered on in step 201. Traditionally, as seen in FIG. 2A (prior art), main memory initialization (INIT) in step 202 occurs prior to multi-processor discovery and initialization (INIT) in step 203. The initialization process then ends in step 204. It is noted, however, that a number of other initialization steps may also occur but are not depicted in FIG. 2A (prior art). As discussed above, because the main memory is shared among the CPUs and used for processor discovery and initialization, the initialization of main memory in step 202 occurs prior to multi-processor initialization in step 203 so that set protection mechanisms or locked semaphores exist to protect main memory from being corrupted by multiple shared accesses.

As also discussed above, current processors have multiple cores (CPUs), and each core can have multiple threads (logical CPUs). In addition, processors, such as Intel processors, are now capable of a number of power states, and depending upon the CPU, the hardware may or may not be able to allow the CPU to move to higher power modes. The CPU will typically begin in low power mode, requiring a handshake process to determine if the CPU can move up power modes. When the CPU moves up, a CPU reset cycle is often required. When the CPU reset cycle occurs, a re-run of the BIOS is required. Because CPU power changes are typically implemented during multi-processor initialization in step 203, much of the BIOS must be re-run including main memory initialization in step 202. As stated above, if this re-initialization of main memory is done, start up time is increased. If this re-initialization of main memory is skipped, other problems can arise due to instability of the memory. As such, this prior initialization process 200 of FIG. 2A is inefficient and undesirable, particularly as the number of APs increase in a multi-processor environment.

Figure 2B:
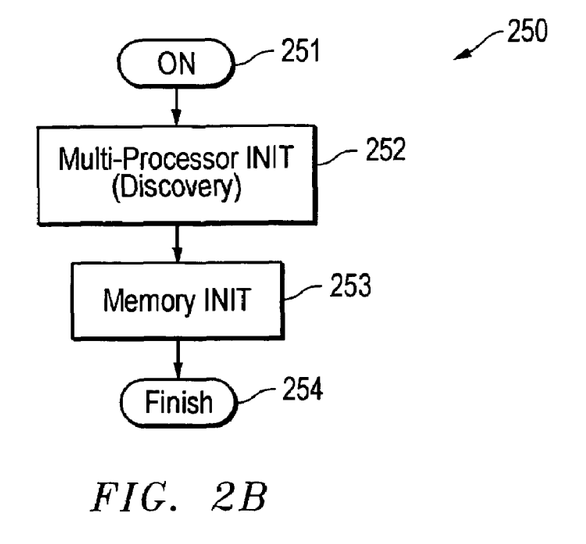
FIG. 2B is a block diagram of an exemplary embodiment of an initialization process for an information handling system with application processors being initialized prior to initialization of main memory.

FIG. 2B is a block diagram of an exemplary embodiment of an initialization process 250 for an information handling system 100 with application processors (APs) being initialized prior to initialization of main memory. As shown, the initialization process begins when the system is powered on in step 251. In contrast with FIG. 2A (prior art), multi-processor discovery and initialization (INIT) in step 252 occurs prior to memory initialization (INIT) in step 253. The initialization process then ends in step 254. It is again noted, however, that a number of other initialization steps may also occur but are not depicted in FIG. 2B.

As discussed in the example embodiments below, one technique for achieving multi-processor initialization prior to memory initialization is to use shared memory space that can be accessed by all APs, but is not part of main memory, and by employing a simple protocol for sharing this memory space and using it to transfer AP identification information from the APs to the BSP. For example, existing shared memory or accessible registers in a memory controller can be used to avoid requiring the initialization of main memory. The APs and BSP use the shared memory and BIOS code state machines to allow communication between them. As discussed herein, the AP code and the BSP code within the BIOS can be configured to cause the BSP and APs to use the shared memory according to a desired protocol in order communicate with each other for AP initialization prior to initialization of main memory. In addition, the BSP can use its own registers to store AP identification data for the multi-processor discovery and initialization phase. If desired, the AP initialization data can then be transferred from the BSP register to main memory once main memory is initialized.

Figure 3A:
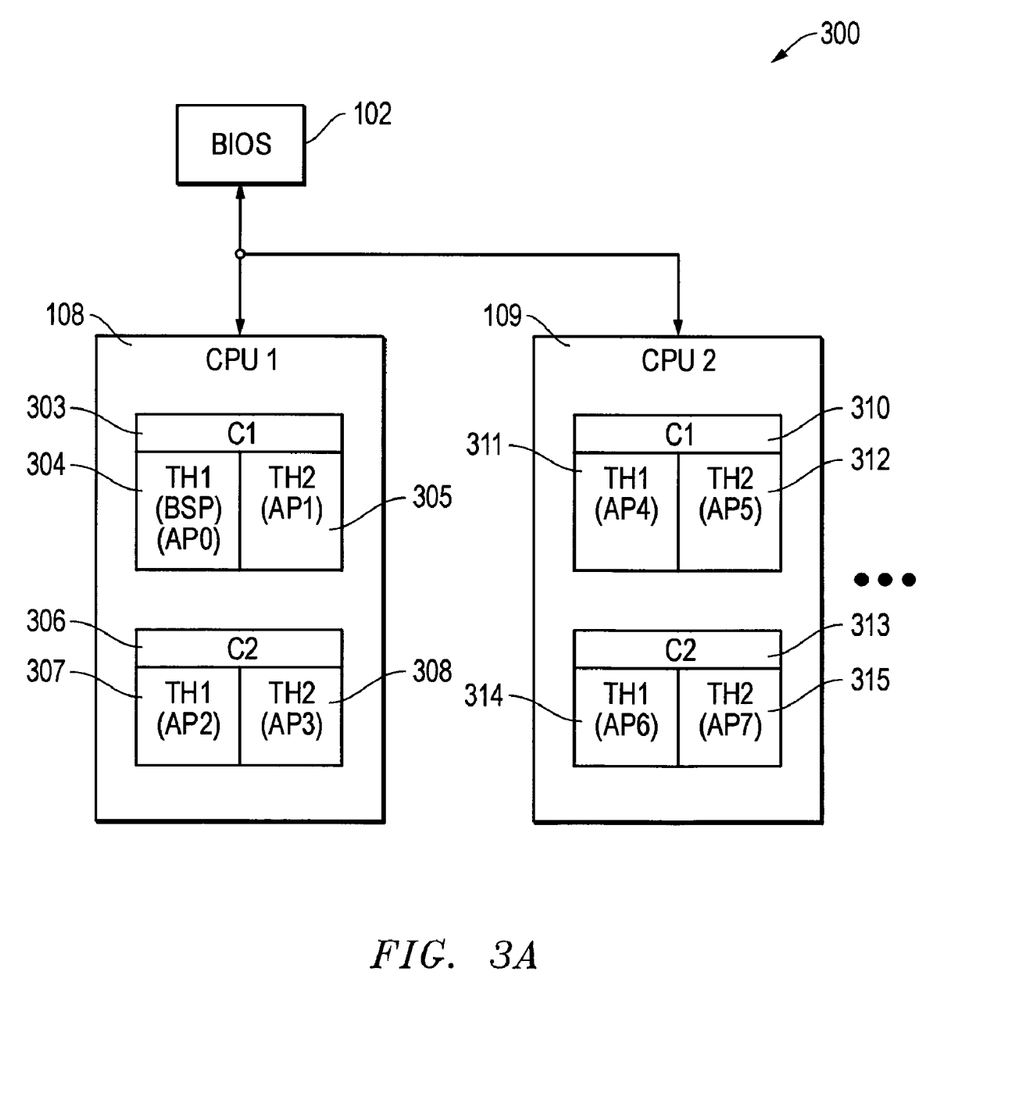
FIG. 3A is a block diagram of an information handling system environment with multiple CPUs, where each CPU has two cores with two threads per core and where one thread is configured as the BSP.

FIG. 3A is a block diagram of an information handling system environment 300 with multiple CPUs 108 and 109 (CPU1 and CPU2). Each CPU 108 and 109 (CPU1 and CPU2) has two cores (C1 and C2) with two threads (TH1 and TH2) per core. One of these threads will be configured as the BSP. The BIOS 102 is coupled to CPUs 108 and 109 (CPU1 and CPU2) and includes BSP code and ASP code. The BSP communicates with other APs to discover and initialize the APs prior to initialization of main memory. While FIG. 3A depicts two CPUs 108 and 109 (CPU1 and CPU2), it is understood that additional and/or different configured CPUs can be used, as desired.

In particular, as depicted, CPU 108 (CPU1) includes processing core 303 (C1) and processing core 306 (C2). Processing core 303 (C1) in turn includes processing thread 304 (C1-TH1) and processing thread 305 (C1-TH2). As depicted, processing thread 304 (C1-TH1) is configured as the BSP and is designated as AP0. Processing thread 305 (C1-TH2) is another AP and is designated AP1. Similarly, processing core 306 (C2) in turn includes two processing threads—processing thread 307 (C2-TH1) and processing thread 308 (C2-TH2). Processing thread 307 (C2-TH1) is an AP and is designated as AP2. Processing thread 308 (C2-TH2) is an AP and is designated AP3. As such, it is seen that in this example CPU 108 (CPU1) has two cores and two threads per core creating a combined total of four APs.

Looking now to CPU 109 (CPU2), a similar configuration to CPU 108 (CPU1) is depicted. In particular, as depicted, CPU 109 (CPU2) includes processing core 310 (C1) and processing core 313 (C2). Processing core 310 (C1) in turn includes processing thread 311 (C1-TH1) and processing thread 312 (C1-TH2). Processing thread 311 (C1-TH1) is an AP and is designated as AP4. Processing thread 312 (C1-TH2) is another AP and is designated AP5. Similarly, processing core 313 (C2) in turn includes two processing threads—processing thread 314 (C2-TH1) and processing thread 315 (C2-TH2). Processing thread 314 (C2-TH1) is an AP and is designated as AP6. Processing thread 315 (C2-TH2) is an AP and is designated AP7. As such, it is seen that in this example CPU 108 (CPU1) has two cores and two threads per core creating a combined total of four APs.

Figure 3B:
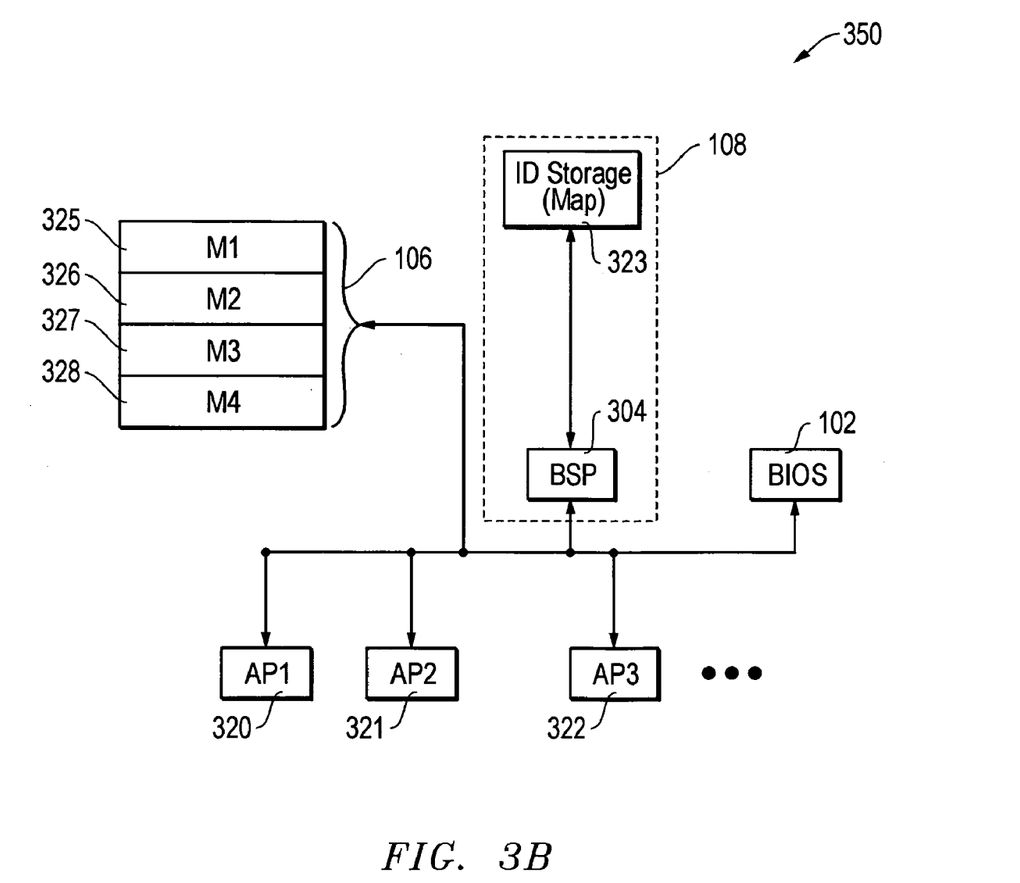
FIG. 3B is a block diagram of an information handling system environment showing shared memory used by the APs and BSP and showing memory for storing processor identification information.

FIG. 3B is a block diagram for an information handling system environment 350 in which shared registers or memory space 106 is used for communicating processor identification data or information in multi-processor discovery and initialization. As depicted, a plurality of APs 320, 321, 322 . . . (AP1, AP2, AP3 . . . ) are coupled to a BSP 304 and the BIOS 102.

The memory space 106 is accessible to the APs 320, 321, 322 . . . (AP1, AP2, AP3 . . . ) and the BSP 304. In addition, as depicted, the memory space 106 includes four memory locations 325, 326, 327 and 328 (M1, M2, M3, M4). Also, as depicted, a register or memory space 323 is provided for storage of identification (ID) information concerning the Aps. This is often called the AP map. The map memory space 323 is accessible to the BSP 304. It is noted that the BSP 304 and map memory space 323 can be located on the same integrated circuit, such as CPU 108 (CPU1), and the memory space 323 can be a CPU register.

While four locations or registers are depicted in FIG. 3B for shared memory 106, it is understood that more or less than four locations of shared memory could exist and could be utilized, if desired. For example, with respect to example flowcharts disclosed in FIGS. 4, 5A, 5B and 6, only the first three of these memory locations (M1, M2, M3) are used. As discussed above, shared memory 106 is accessed through operation of the BSP code and the AP code in order to allow communications for multi-processor initialization without the need for initialization of main memory. It is also noted that in an Intel chipset configuration, the share memory space can be one or more registers accessible to CPUs in the NORTHBRIDGE section of an Intel chipset. The NORTHBRIDGE section of an Intel chipset typically interconnects CPUs with main memory to control high-speed data channels, while the SOUTHBRIDGE section of a Intel chipset typically controls lower speed data channels to lower speed devices and circuitry. The memory controller 105 in FIG. 1 can be part of the NORTHBRIDGE section. As such, the system can take advantage of existing shared register memory space within a standard Intel chipset for multi-processor discovery and initialization without requiring the initialization of main memory.

Figure 4:
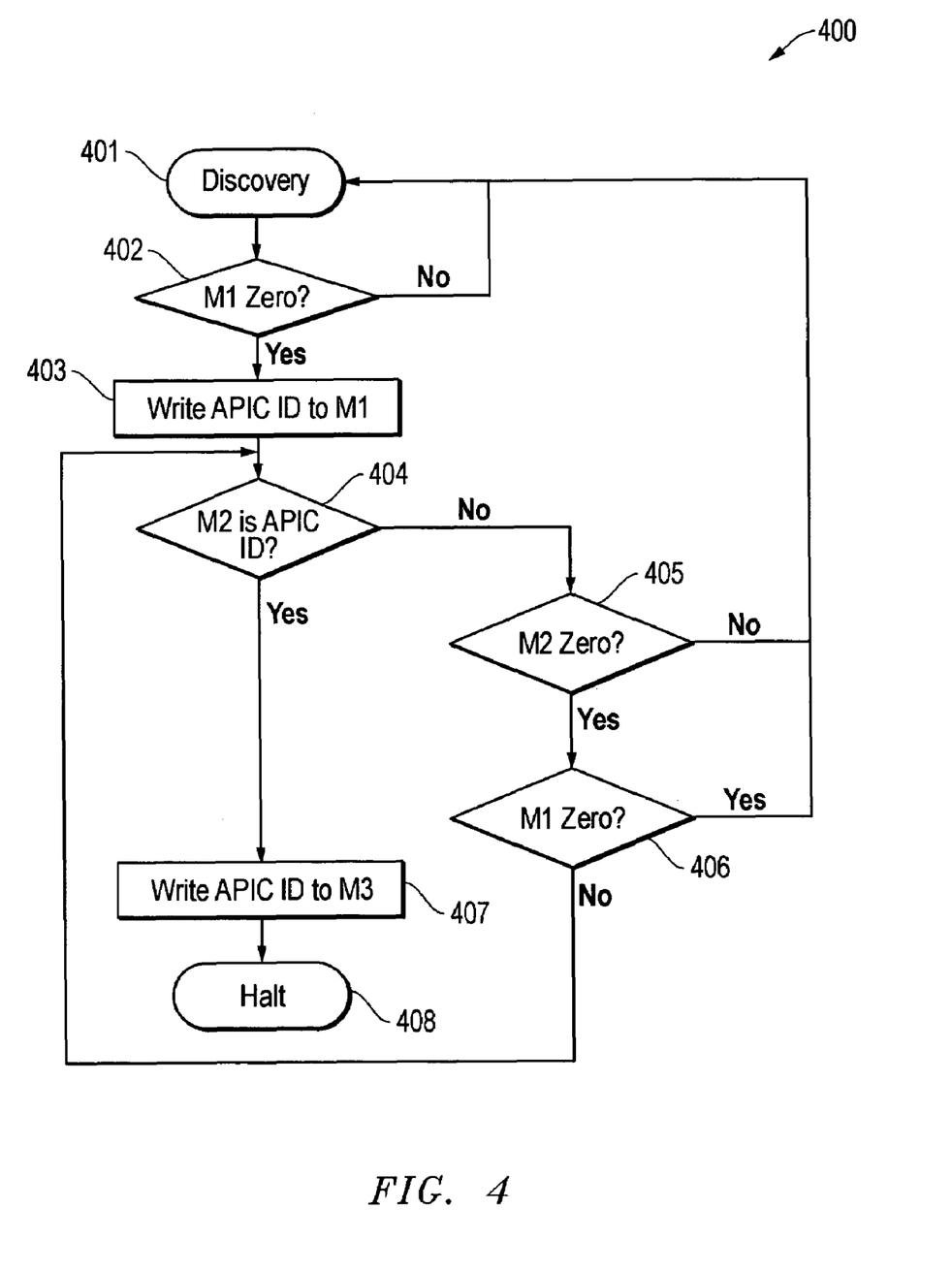
FIG. 4 is a flowchart for a portion of an initialization process relating to ASP code.
Figure 5A:
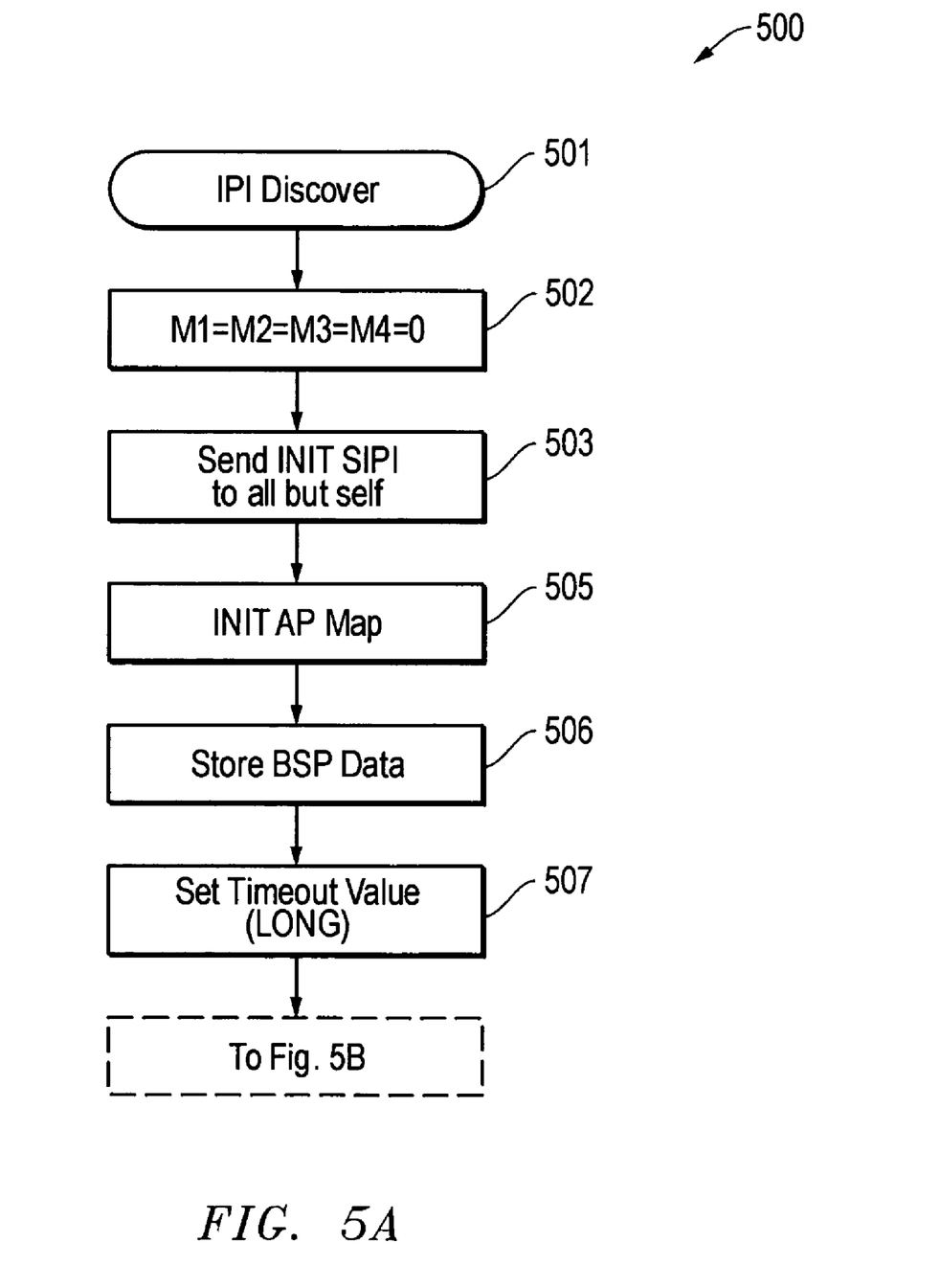
FIGS. 5A-B are a flowcharts for a portion of an initialization process relating to BSP code.
Figure 5B:
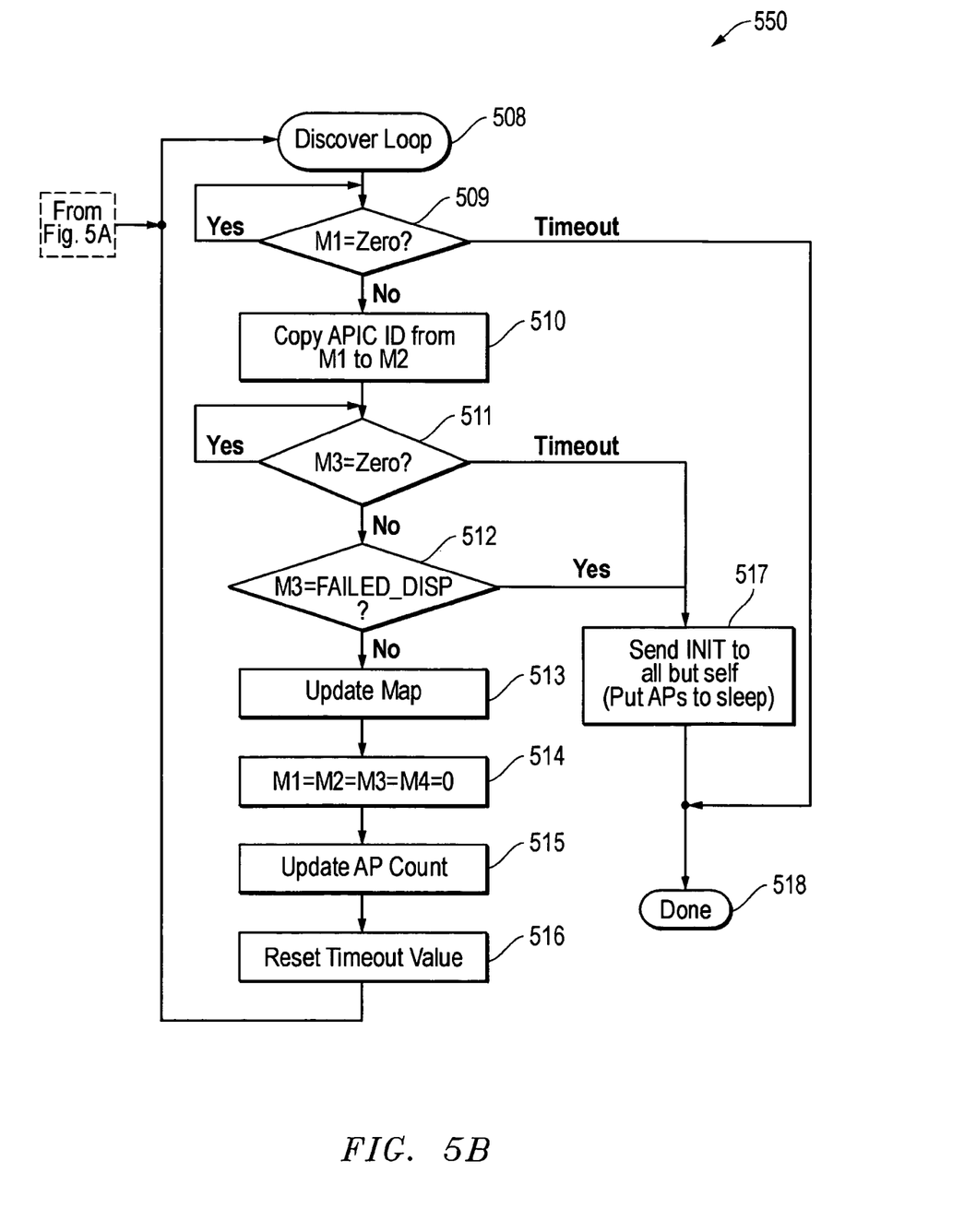
Figure 6:
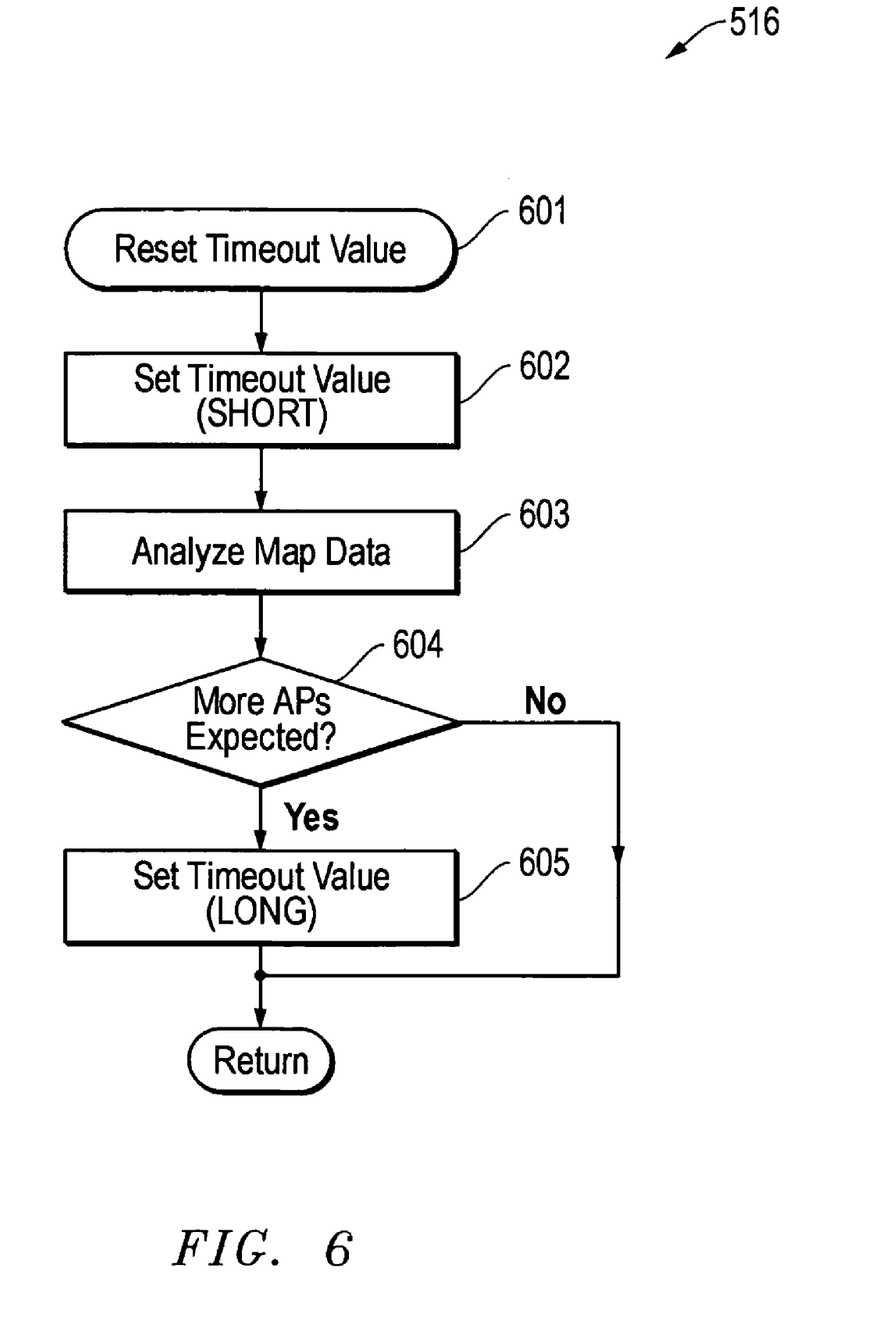
FIG. 6 is a flowchart of a timeout adjustment routine for a step in FIG. 5B.

The operation of the BSP and APs are now discussed with respect to FIGS. 4, 5A, 5B and 6. FIG. 4 is a flowchart for a portion 400 of an initialization process relating to the operation of ASP code within the BIOS. FIGS. 5A-B are a flowcharts for a portion 500 and 550 of an initialization process relating to BSP code. FIG. 6 is a flowchart of a timeout adjustment routine for a step in FIG. 5B.

Referring first to FIG. 5A, flowchart 500 is depicted showing the initial process steps associated with the BSP code and run by the BSP. In step 501, processor discovery and initialization begins using inter-processor interrupt (IPI) communications. In step 502, the shared memory locations are initialized to zero (M1=M2=M3=M4=0). In step 503, the BSP sends an INIT-SIPI (initialize+startup inter-processor interrupt) command to all APs, except for itself, through the IPI (inter-processor interrupt) buss. Next, in step 505, the BSP conducts initialization (INIT) of the AP map that it will create and store during the process. In step 506, the BSP stores its own information in the AP map. In step 507, a process timeout value is set to its LONG state. The BSP process the transitions to FIG. 5B. It is noted that the AP information stored can include information such as the CPU manufacturer, the speed of the CPU, the number of cores on the CPU, the number of threads per core on the CPU, and/or any other desired information concerning the CPU or the APs on the CPU.

Referring now to FIG. 4, flowchart 400 is depicted showing the process steps associated with the AP code and run by each of the APs. The AP code begins the discovery process in step 401. In decision step 402, the AP determines whether M1 is still set to zero. If not, it loops back to step 401 until decision step 402 yields a "yes." In step 403, the AP issue a write command to write its APIC ID to M1. (The APIC ID is a unique identifier for each AP.) In decision step 404, the AP determines whether M2 is equal to its APIC ID thereby determining if its write was successful. If "yes," then the AP writes its APIC ID to M3 in step 407. The process for the AP then halts in step 408. If the determination in decision step 404 is "no," then decision step 405 is reached where the AP checks to see if M2 is zero. If "no," then the discovery process restarts at step 401. If "yes," then decision step 406 is reached where the AP checks to see if M1 is zero. If "yes," then the discovery process restarts at step 401. If "no," then the process proceeds back to decision step 404.

FIG. 5B is a flowchart 550 showing steps as continued from FIG. 5A for BSP code. From FIG. 5A, flow proceeds to discover loop 508. Next, a determination is made in step 509 whether the first location in the memory (M1) is zero. If "yes," the process loops until the decision step 509 results in a "no" determination. If a timeout occurs during this loop, the process proceeds to step 518 (DONE) and ends. If "no" is the result of determination step 509, the APIC ID is copied from the first location in the shared memory (M1) to the second location in the shared memory (M2) in step 510. Next, in decision step 511, a determination is made regarding whether a third location in the shared memory (M3) is zero. If "yes," the process loops until the decision step 511 results in a "no" determination. If a timeout occurs during this loop, the process proceeds to step 517. Once a "no" determination has been received in decision step 511, decision step 512 is reached where the BSP determines if M3 holds an APIC ID or holds a failure code (FAILED_DISP) indicating an end of discovery. If "yes," the process proceeds to step 517. If "no," the process proceeds to step 513 where the AP map is updated by the BSP. Next, the BSP again sets the memory location to zero in step 514 (M1=M2=M3=M4=0). In step 515, the BSP updates an AP counter it uses to keep track of the number of APs it has processed. In block 516, the BSP resets the timeout value according to FIG. 6. If step 517 is reached from decision blocks 511 or 512, then the BSP sends an INIT command to all processors except itself to put all APs into a sleep mode. The process then proceeds to step 518 (DONE) and ends.

FIG. 6 is a flowchart showing the steps for step 516 in FIG. 5B used to reset the timeout value. Timeout is an event that indicates a predetermined amount of time has elapsed without some expected event occurring. A timeout event interrupts a process that had been waiting for the expected event. The timeout value is the predetermined amount of time within which the timeout event must occur to prevent a system from interrupting a process or "timing out." The reset timeout value process 516 begins with step 601. Next, in step 602, the timeout value is set to a short timeout value (SHORT). In step 603, the AP map data stored by the BSP is analyzed by the BSP. In decision step 604, a determination is made whether any more APs are expected by the BSP. If "no," the process ends, the timeout value stays set to a short value (SHORT), and flow returns to step 508 in FIG. 5B. If "yes," the timeout value is set to a long value (LONG) in step 605 before the process flow returns to step 508 in FIG. 5B. The values for the long timeout value (LONG) and the short timeout value (SHORT) can be selected, as desired, depending upon the expected amounts of time that would indicate no further actions will occur.

As described with respect to FIGS. 4, 5A, 5B and 6, therefore, the BSP initially sets four memory locations, such as four consecutive input/output (IO) byte addresses, for use in the discovery process by the BSP and APs. It is noted, however, that only three of these memory locations are used. These memory locations can be designated IPI (inter-processor interrupt) registers M1 through M4 and can be the four locations of shared memory 106 (M1, M2, M3 and M4) in FIG. 3B. Four are indicated within the example embodiment because these four memory locations are considered to match a standard four-byte access that can be used for registers within some standard memory controllers 105.

In operation, as the process begins, the BSP initializes the registers M1, M2, M3 and M4 to zero. Each application processor (AP) tries to then write its APIC ID to register M1. The BSP responds with the value it reads from M1 by writing it to M2. This action allows the APs to know when the BSP has read its APIC ID. In this way, the process handles the race among the APs for reporting their existence and handles potential conflicts in concurrent memory access. The AP with its APIC ID stored by the BSP in M2 completes its detection function by writing its APIC ID in register M3 or by writing a fail condition code (FAILED_DISP) in register M3 if a failure has occurred. When the BSP detects a AIPC ID in register M3, all four registers are cleared so that the next AP can report its existence (if pass) or the same or next AP can report its existence (if fail). The BSP also adds the successful AP information to the AP map it is storing in memory space accessible to the BSP. In this way, for example, the APIC ID data and information for the APs and the system organization information can be obtained by the BSP and maintained by the BSP in memory space accessible to the BSP. This AP map, for example, can be stored in internal CPU registers for the CPU having the BSP. Again, as stated above, the communication process among the BSP and APs can occur using a single four-byte accessible register that can be accessed by the BSP and the APs, although only three of these registers are used in the example above.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for multi-processor initialization in an information handling system, comprising:
   providing two or more application processors (APs) within an information handling system;
   configuring one of the APs to be a boot strap processor (BSP) for the information handling system;
   operating the BSP to communicate with the other APs to initialize the APs prior to initialization of main memory; and
   operating each AP to communicate with the BSP for AP initialization.

2. The method of claim 1, further comprising providing a basic input output system (BIOS) within the information handling system and configuring the BIOS to have BSP code and AP code utilized by the BSP and the APs to perform the operating steps.

3. The method of claim 1, further comprising utilizing shared memory to communicate between the BSP and the APs for the operating steps.

4. The method of claim 3, wherein the shared memory is not part of main memory.

5. The method of claim 4, further comprising utilizing a plurality of registers for the shared memory, the registers being accessible to the BSP and each of the APs.

6. The method of claim 3, further comprising sending a command from the BSP to the other APs to cause the APs to each attempt to access a first location in the shared memory to write identification data.

7. The method of claim 6, further comprising operating the BSP to read identification data for one of the APs from the first location in the shared memory and to move the identification data to a second location in the shared memory.

8. The method of claim 7, further comprising operating the AP to read the second location in shared memory to determine if its identification data is in the second location and if so, to write initialization pass or fail information to a third location in the shared memory.

9. The method of claim 8, further comprising operating the BSP to read the third location in shared memory to determine if the AP has been initialized successfully.

10. The method of claim 9, further comprising ending the multi-processor initialization when each AP has written initialization pass information to the third location in shared memory.

11. The method of claim 3, further comprising operating the BSP to store identification data for each AP.

12. The method of claim 11, wherein the BSP stores the identification data for the APs in one or more registers on an integrated circuit within which the BSP is integrated.

13. The method of claim 1, further comprising utilizing a plurality of microprocessors to provide the multiple APs.

14. An information handling system having multi-processor initialization for multiple application processors, comprising:
   two or more application processors (APs) within an information handling system, at least one application processor (AP) configured to be a boot strap processor (BSP) for the information handling system;
   a basic input output system (BIOS) coupled to the APs;
   main memory coupled to the APs;
   BSP code within the BIOS, the BSP code configured to cause the BSP to communicate with the other APs in order to initialize the APs prior to initialization of main memory; and
   AP code within the BIOS, the AP code configured to cause each AP to communicate with the BSP for AP initialization.

15. The information handling system of claim 14, further comprising shared memory coupled to the BSP and to each other AP, the BSP code and AP code configured to cause the BSP and APs to utilize the shared memory to communicate for multi-processor initialization.

16. The information handling system of claim 15, wherein the shared memory is not part of the main memory.

17. The information handling system of claim 16, wherein the shared memory comprises a plurality of registers accessible to the BSP and the APs.

18. The information handling system of claim 14, further comprising a memory space coupled to the BSP and wherein the BSP code is configured to cause the BSP to store identification data for the APs in the memory space.

19. The information handling system of claim 14, further comprising a plurality of integrated circuit processors with each processor having a plurality of APs, one which is configured to be the BSP.

20. The information handling system of claim 19, wherein each integrated circuit processor has multiple processing cores.

* * * * *

UNITED STATES PATENT AND TRADEMARK OFFICE
CERTIFICATE OF CORRECTION

| | | |
|---|---|---|
| PATENT NO. | : 7,600,109 B2 | Page 1 of 1 |
| APPLICATION NO. | : 11/445432 | |
| DATED | : October 6, 2009 | |
| INVENTOR(S) | : Ueltschey, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Fifth Day of October, 2010

David J. Kappos
*Director of the United States Patent and Trademark Office*